(12) United States Patent
Nishinuma et al.

(10) Patent No.: US 11,309,607 B2
(45) Date of Patent: Apr. 19, 2022

(54) BATTERY PACK (71) Applicant: HONDA MOTOR CO., LTD., Tokyo (JP)

(72) Inventors: Takuya Nishinuma, Wako (JP); Hiroto Kobayashi, Wako (JP); Akinori Shimomai, Wako (JP); Keiichi Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/889,974

(22) Filed: Jun. 2, 2020

(65) Prior Publication Data

US 2020/0388803 A1   Dec. 10, 2020

(30) Foreign Application Priority Data

Jun. 4, 2019 (JP) .............................. JP2019-104141

(51) Int. Cl.
*H01M 50/20* (2021.01)
*H01M 50/502* (2021.01)

(52) U.S. Cl.
CPC ......... *H01M 50/20* (2021.01); *H01M 50/502* (2021.01); *H01M 2220/20* (2013.01)

(58) Field of Classification Search
CPC ............... H01M 2/1077; H01M 2/206; H01M 2220/20; H01M 10/6554; H01M 10/613; H01M 10/625; H01M 10/643
See application file for complete search history.

(56) References Cited

U.S. PATENT DOCUMENTS

| 6,111,387 | A  | * | 8/2000  | Kouzu .............. | H01M 10/643 |
|---|---|---|---|---|---|
|  |  |  |  |  | 320/107 |
| 8,597,843 | B2 | * | 12/2013 | Yamamoto ........ | H01M 10/6554 |
|  |  |  |  |  | 429/434 |
| 2008/0314657 | A1 | * | 12/2008 | Ikeda ................. | H01M 50/502 |
|  |  |  |  |  | 180/65.1 |
| 2013/0052515 | A1 | * | 2/2013  | Park ................... | H01M 2/206 |
|  |  |  |  |  | 429/159 |
| 2015/0255225 | A1 | * | 9/2015  | Kusaba .............. | H01G 11/76 |
|  |  |  |  |  | 429/120 |
| 2016/0172642 | A1 | * | 6/2016  | Hughes .............. | H01M 50/213 |
|  |  |  |  |  | 429/90 |

(Continued)

FOREIGN PATENT DOCUMENTS

| DE | 102012224114 | 6/2014 |
|---|---|---|
| EP | 2562842 | 2/2013 |

(Continued)

OTHER PUBLICATIONS

Extended European Search Report for European Patent Application No. 20177940.2 dated Aug. 18, 2020.

*Primary Examiner* — Michael L Dignan
(74) *Attorney, Agent, or Firm* — Amin, Turocy & Watson, LLP (57) ABSTRACT

A battery pack includes a first core pack and a second core pack each holding a plurality of unit cells. The unit cells of a first cell group or second cell group that is closest to a connector are electrically connected to the connector through a third busbar. The unit cells of the first cell group or second cell group that is most distant from the connector are electrically connected to the connector through a fourth busbar.

4 Claims, 8 Drawing Sheets

(56) References Cited

U.S. PATENT DOCUMENTS

| | | | | |
|---|---|---|---|---|
| 2016/0218401 | A1* | 7/2016 | Hermann | H01M 10/627 |
| 2017/0005371 | A1* | 1/2017 | Chidester | B60L 15/20 |
| 2017/0062789 | A1* | 3/2017 | Sim | H01M 50/502 |
| 2019/0051873 | A1* | 2/2019 | Nakayama | B60L 50/64 |

FOREIGN PATENT DOCUMENTS

| | | |
|---|---|---|
| JP | 2011-049013 | 3/2011 |
| JP | 2011-216366 | 10/2011 |
| WO | 2019/230879 | 12/2019 |

* cited by examiner

BATTERY PACK

CROSS-REFERENCE TO RELATED APPLICATION

This application is based upon and claims the benefit of priority from Japanese Patent Application No. 2019-104141 filed on Jun. 4, 2019, the contents of which are incorporated herein by reference.

BACKGROUND OF THE INVENTION

Field of the Invention

The present invention relates to a battery pack including a plurality of core packs accommodated in a case.

Description of the Related Art

Battery packs are removably installed as a power source in various devices. As described in Japanese Laid-Open Patent Publication No. 2011-216366, this type of battery pack includes a core pack containing a plurality of unit cells and accommodated in the hollow interior of a case. The unit cells are aligned in a plurality of rows, for example, and the unit cells of a cell row (arbitrary row) are positioned such that their positive electrodes are directed in the same direction. Further, the unit cells of a cell row (adjacent row) adjoining that arbitrary cell row are positioned such that their positive electrodes are directed in the direction opposite to the direction in which the positive electrodes of the unit cells of that arbitrary row are directed.

Accordingly, the positive electrodes of the unit cells of that arbitrary row and the negative electrodes of the unit cells of that adjacent row are directed in the same direction. The positive electrodes and the negative electrodes are then electrically connected to each other through a busbar. That is, the unit cells of the arbitrary row and the unit cells of the adjacent row are electrically connected in series.

A connector is provided in the case, at the bottom thereof, for example, and the connector is engaged with a connector provided in an external device such as an electric vehicle etc. That is, the two connectors are electrically connected to each other. Then, the electric power from the battery pack is supplied to the external device through the two connectors.

SUMMARY OF THE INVENTION

A plurality of core packs may be accommodated in the case in order to provide larger discharge capacity and larger voltage. To realize this configuration, the cell rows of mutually facing core packs that are located most distant from the connector may be electrically connected to each other in series through a busbar (see FIG. 4). In this case, among all busbars, the busbar laid across the cell row closest to the positive terminal of the connector and the row adjacent to this row presents the highest potential. On the other hand, the busbar laid across the cell row closest to the negative terminal of the connector and the row adjacent thereto presents the lowest potential among all busbars. The lowest-potential busbar and the highest-potential busbar face each other in the case.

Now, although the battery pack itself is sealed, the lowest-potential busbar and the highest-potential busbar may be short circuited in case rain water or the like enters the battery pack. The possibility of occurrence of short circuit will be high especially when the potential difference between the two busbars is large.

A main object of the present invention is to provide a battery pack that can reduce short-circuit current between busbars as much as possible even when, for example, water enters the battery pack.

According to an embodiment of the present invention, provided is a battery pack including a case accommodating a plurality of unit cells each having a first electrode and a second electrode, and a connector provided in the case, the battery pack including:

a first core pack and a second core pack each configured to hold a plurality of the unit cells, the first core pack and the second core pack being accommodated in the case so as to face each other, wherein, in the first core pack and the second core pack, first cell groups are constituted by a plurality of the unit cells that are positioned in such a manner that the first electrodes thereof are directed in a same direction, and second cell groups are constituted by a plurality of the unit cells that are positioned in such a manner that the first electrodes thereof are directed in a direction opposite to the direction in which the first electrodes of the unit cells of the first cell groups are directed, the first cell groups and the second cell groups being arranged alternately;

first busbars each configured to electrically connect the unit cells of one of the first cell groups and the unit cells of one of the second cell groups in the first core pack or the second core pack;

a second busbar configured to electrically connect the unit cells of one of the first cell groups or the second cell groups in the first core pack and the unit cells of one of the first cell groups or the second cell groups in the second core pack;

a third busbar configured to electrically connect the connector and the unit cells of one of the first cell groups or the second cell groups that is closest to the connector in the first core pack or the second core pack; and a fourth busbar configured to electrically connect the connector and the unit cells of one of the first cell groups or the second cell groups that is most distant from the connector in the first core pack or the second core pack.

According to the present invention, the unit cells of the first cell group or the second cell group that is closest to the connector are electrically connected to the connector through the third busbar, and the unit cells of the first cell group or the second cell group that is most distant from the connector are electrically connected to the connector through the fourth busbar. Accordingly, among the busbars electrically connecting the cell groups, the busbar presenting the highest potential and the busbar presenting the lowest potential do not face each other.

That is, the potential difference between mutually facing busbars is small. Consequently, even if water enters the case of the battery pack, a short circuit is avoided depending on the potential difference between the two busbars. Further, even if a short circuit occurs, the short-circuit current is small because the potential difference between the mutually facing busbars is sufficiently smaller than in configurations in which the highest potential busbar and the lowest potential busbar face each other. The amount of heat generated by the unit cells is therefore reduced.

The above and other objects, features, and advantages of the present invention will become more apparent from the following description when taken in conjunction with the

DESCRIPTION OF THE PREFERRED EMBODIMENTS

The battery pack according to the present invention will be described below in detail referring to the accompanying drawings in conjunction with preferred embodiments.

Figure 1:
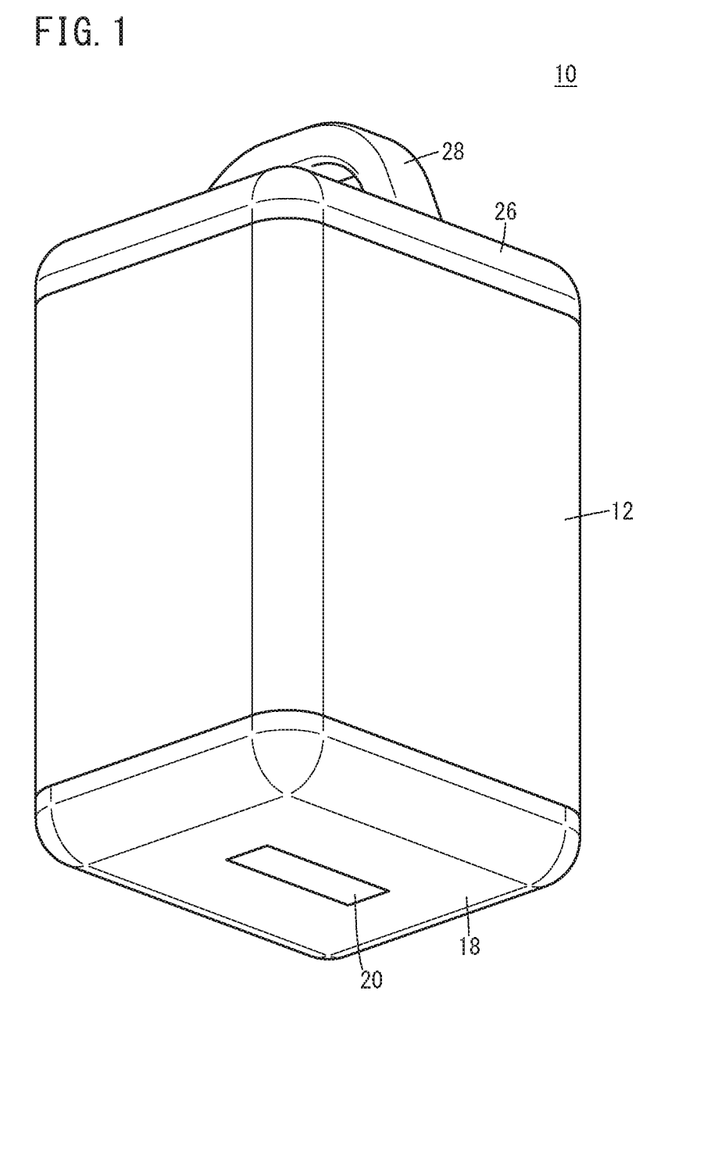
FIG. 1 is a schematic perspective view illustrating the entirety of a battery pack according to a first embodiment of the present invention.
Figure 2:
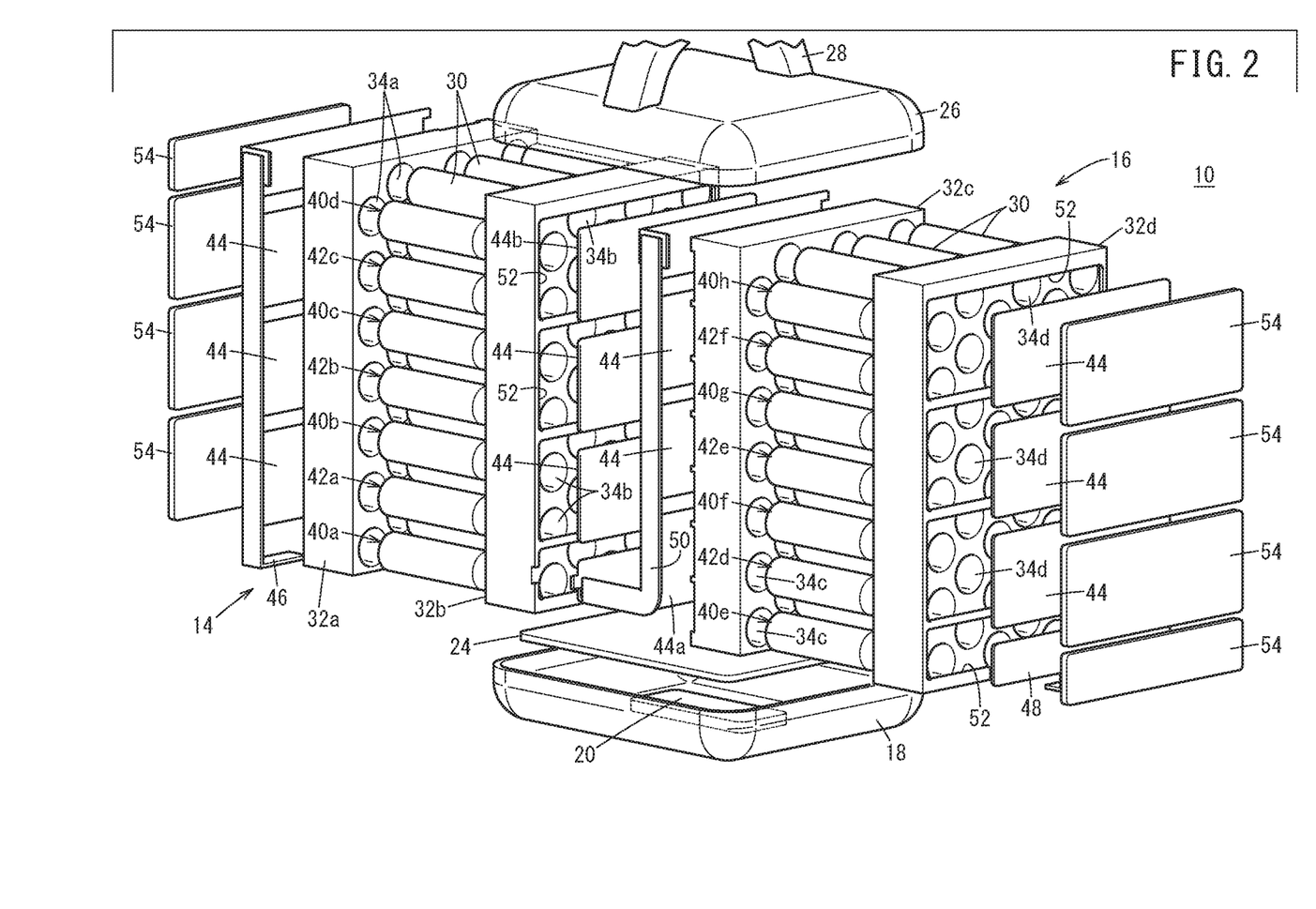
FIG. 2 is a schematic exploded perspective view of the battery pack of FIG. 1.
Figure 3:
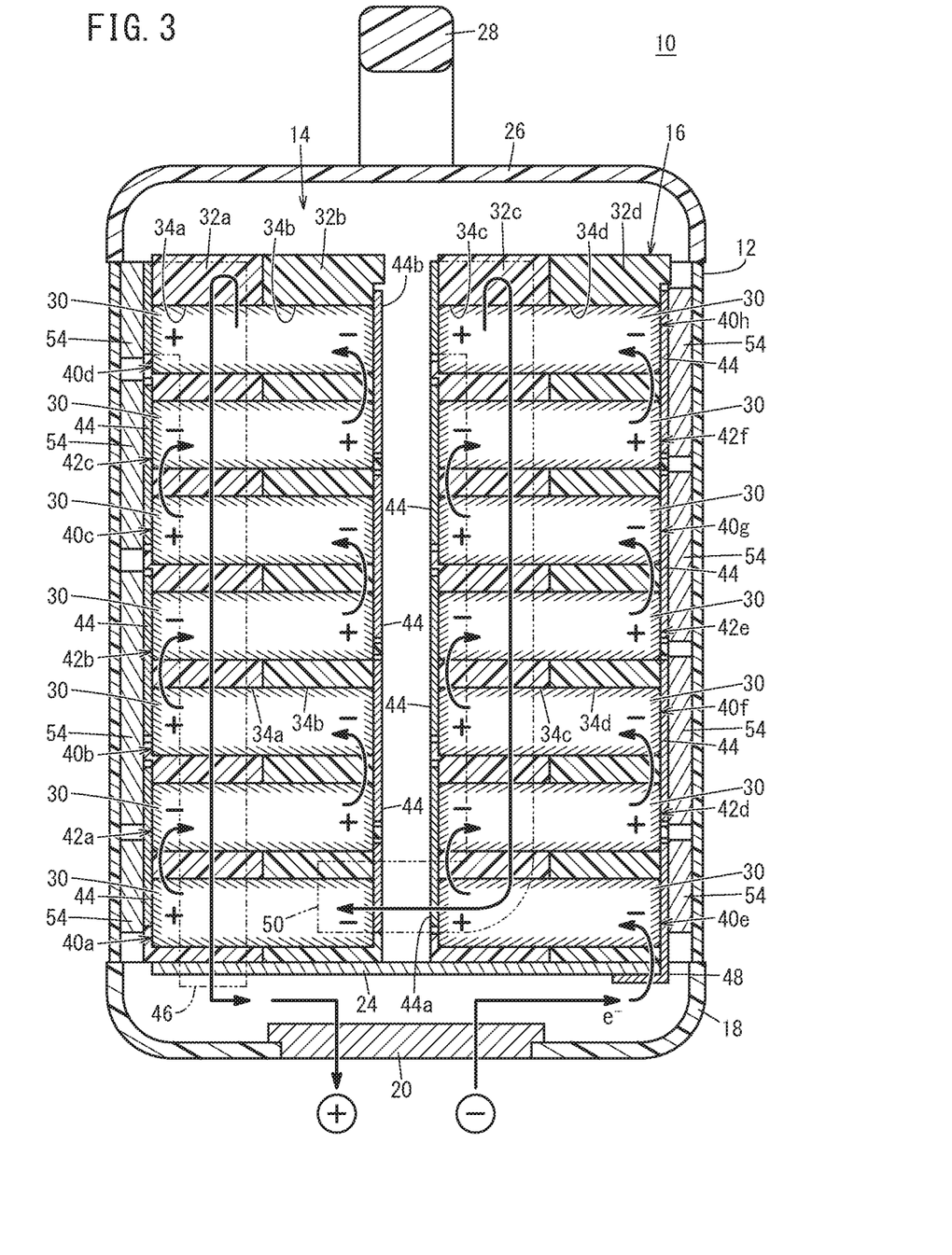
FIG. 3 is a schematic longitudinal cross section taken along a lengthwise direction of the battery pack of FIG. 1.

FIGS. 1 to 3 are a schematic perspective view showing the entirety of a battery pack 10 of this embodiment, a schematic exploded perspective view thereof, and a schematic longitudinal cross section taken along a lengthwise direction thereof, respectively. The battery pack 10 includes a case 12 formed like a hollow quadrangular prism having both its ends opened, and a first core pack 14 and a second core pack 16 accommodated in the hollow interior of the case 12. The case 12 is manufactured by extrusion molding of a material made of aluminum or aluminum alloy, for example. In this case, the case 12 can be robust and light in weight, and provides high thermal conductivity and hence superior heat transfer efficiency. Furthermore, the case 12 can be manufactured at low cost since the material is low priced.

The opening at the bottom of the case 12 is closed by a bottom case 18. A connector 20 is provided in the bottom of the bottom case 18, where the connector 20 extracts electric power from the first core pack 14 and the second core pack 16 in discharging operation and supplies electric power to the first core pack 14 and the second core pack 16 in charging operation. The connector 20 has a positive terminal and a negative terminal (neither of which is shown).

Further, a battery management unit (BMU) 24 is inserted between the bottom case 18 and the first core pack 14 and second core pack 16, where the BMU 24 is a control unit for managing temperatures and voltages of the first core pack 14 and the second core pack 16. The BMU 24 serves also as a communication unit for performing communications with the external equipment (an electric vehicle etc.) and charger device.

On the other hand, the top opening of the case 12 is closed by a top case 26. A handle 28 shaped like an arch is formed on the top case 26, where the user can hold the handle 28 to lift up or carry the battery pack 10.

The first core pack 14 includes a plurality of unit cells 30 held in a first cell holder 32a and a second cell holder 32b. In this case, each unit cell 30 is shaped like a cylinder and has a positive electrode and a negative electrode provided at both ends of its axial direction. The positive electrode is a first electrode, for example, in which case the negative electrode is a second electrode having the polarity reverse of the positive electrode. Configuration of such unit cells 30 is well known and so the positive electrodes and negative electrodes will not be graphically shown nor described in detail herein.

A preferred example of the unit cells 30 can be lithium-ion secondary cells, but the unit cells 30 are not particularly limited thereto. Other preferred examples include nickel-hydrogen cells, nickel-cadmium cells, etc.

The first cell holder 32a and the second cell holder 32b have a plurality of storage holes 34a, 34b formed therethrough, respectively. The storage holes 34a, 34b are connected to each other as the first cell holder 32a and the second cell holder 32b are joined together. The diameter of the storage holes 34a, 34b corresponds to the diameter of the unit cells 30. The length of the connected storage holes 34a, 34b corresponds to the height of the unit cells 30. The unit cells 30 are arranged in such a manner that their lengthwise direction lies orthogonal to the lengthwise direction (top-bottom direction) of the battery pack 10. In this attitude, the unit cells 30 are individually inserted and held in the storage holes 34a, 34b.

The unit cells 30 inserted in the storage holes 34a, 34b are arranged in parallel with one another along a widthwise direction that is orthogonal to the lengthwise direction thereof. A row of multiple unit cells 30 arranged in the widthwise direction will hereinafter be referred to as a "cell group".

With the first cell holder 32a and the second cell holder 32b, the unit cells 30 of the lowermost cell group that is located closest to the connector 20 are positioned in such a manner that the negative electrodes thereof face the second core pack 16. Further, in the cell group that is located right above the lowermost one, the unit cells 30 are positioned in such a manner that the positive electrodes thereof face the second core pack 16. Now, the cell groups including unit cells 30 having negative electrodes facing the second core pack 16 will hereinafter be referred to as "first cell groups", and the cell groups including unit cells 30 having positive electrodes facing the second core pack 16 will hereinafter be referred to as "second cell groups".

The cell group located right above the lowermost second cell group is a first cell group, and the cell group located right above this first cell group is a second cell group. The first cell groups and the second cell groups are disposed alternately in this way. That is, in adjacent cell groups, electrodes with reverse polarities are directed in the same direction.

In this embodiment, the first core pack 14 includes four first cell groups and three second cell groups. In order that the cell groups can be identified easily, the first cell groups will hereinafter be labeled using reference numerals as 40a, 40b, 40c, 40d from bottom to top. Also, the second cell groups will be labeled as 42a, 42b, 42c from bottom to top. Note that hereinafter the wording "the positive electrodes (or negative electrodes) of a first cell group" means "the positive electrodes (or negative electrodes) of the unit cells 30 constituting the first cell group". Similarly, "the positive electrodes (or negative electrodes) of a second cell group" means "the positive electrodes (or negative electrodes) of the unit cells 30 constituting the second cell group".

The positive electrodes of the first cell group 40a and the negative electrodes of the second cell group 42a are electrically connected in series through a cell group interconnection busbar 44 (first busbar) laid across the adjacent cell groups. The cell group interconnection busbar 44 serves also to electrically parallel-connect the positive electrodes of the unit cells 30 forming the first cell group 40a, and the negative electrodes of the unit cells 30 forming the second cell group 42a.

In the same way, the positive electrodes of the second cell group 42a and the negative electrodes of the first cell group 40b, the positive electrodes of the first cell group 40b and the negative electrodes of the second cell group 42b, the positive electrodes of the second cell group 42b and the negative electrodes of the first cell group 40c, the positive electrodes of the first cell group 40c and the negative electrodes of the second cell group 42c, and the positive electrodes of the second cell group 42c and the negative electrodes of the first cell group 40d, are electrically connected in series respectively through cell group interconnection busbars 44. The cell group interconnection busbars 44, of course, each electrically connect the unit cells 30 of the same cell group in parallel.

The positive electrodes of the uppermost first cell group 40d are electrically connected to the positive terminal of the connector 20 through a positive-side connection busbar 46 (fourth busbar). That is, the positive-side connection busbar 46 extends down from the first cell group 40d so as to electrically connect the positive electrodes of the first cell group 40d, which is most distant from the connector 20, and the positive terminal of the connector 20. The positive-side connection busbar 46 electrically parallel-connects the positive electrodes of the unit cells 30 forming the first cell group 40d.

Similarly, the second core pack 16 includes a plurality of unit cells 30 held in a third cell holder 32c and a fourth cell holder 32d. That is, the third cell holder 32c and the fourth cell holder 32d have a plurality of storage holes 34c, 34d formed therethrough, respectively. The storage holes 34c, 34d are connected to each other as the third cell holder 32c and the fourth cell holder 32d are joined together. The unit cells 30 are positioned in such a manner that their lengthwise direction lies orthogonal to the lengthwise direction (top-bottom direction) of the battery pack 10. In this attitude, the unit cells 30 are individually inserted and held in the storage holes 34c, 34d.

Hereinafter, the cell groups in which the positive electrodes are directed in the same direction as the positive electrodes of the first cell groups 40a to 40d of the first core pack 14 will be referred to as "first cell groups", and the cell groups in which the negative electrodes are directed in the same direction as the negative electrodes of the second cell groups 42a to 42c of the first core pack 14 will be referred to as "second cell groups". Accordingly, in the second core pack 16, the positive electrodes of the unit cells 30 forming the first cell groups and the negative electrodes of the unit cells 30 forming the second cell groups face the first core pack 14.

In the second core pack 16, the lowermost cell group that is located closest to the connector 20 is a first cell group, and the one right above this first cell group is the lowermost second cell group. Also, the one right above this second cell group is a first cell group. That is, the first cell groups and the second cell groups are arranged alternately also in the second core pack 16. In this embodiment, the second core pack 16 includes four first cell groups and three second cell groups. In order that the cell groups can be identified easily, the first cell groups will hereinafter be labeled using reference numerals as 40e, 40f, 40g, 40h from bottom to top. Also, the second cell groups will be labeled as 42d, 42e, 42f from bottom to top.

The negative terminal of the connector 20 is electrically connected to the negative electrodes of the first cell group 40e that is closest to the connector 20, through a negative-side connection busbar 48 (third busbar). Further, the positive electrodes of this first cell group 40e are electrically connected in series to the negative electrodes of the second cell group 42d through a cell group interconnection busbar 44.

In the same way, the positive electrodes of the second cell group 42d and the negative electrodes of the first cell group 40f, the positive electrodes of the first cell group 40f and the negative electrodes of the second cell group 42e, the positive electrodes of the second cell group 42e and the negative electrodes of the first cell group 40g, the positive electrodes of the first cell group 40g and the negative electrodes of the second cell group 42f, and the positive electrodes of the second cell group 42f and the negative electrodes of the first cell group 40h, are electrically connected in series respectively through cell group interconnection busbars 44. As in the first core pack 14, the cell group interconnection busbars 44 each electrically connect the unit cells 30 of the same cell group in parallel.

Further, the positive electrodes of the first cell group 40h that is located uppermost in the second core pack 16 are electrically connected in series to the negative electrodes of the first cell group 40a that is located lowermost in the first core pack 14, through a core pack interconnection busbar 50 (second busbar). That is, the core pack interconnection busbar 50 extends down from the first cell group 40h, so as to electrically connect the positive electrodes of the first cell group 40h most distant from the connector 20 in the second core pack 16 and the negative electrodes of the first cell group 40a that is closest to the connector 20 in the first core pack 14.

The core pack interconnection busbar 50 electrically parallel-connects the positive electrodes of the unit cells 30 forming the first cell group 40h. The portion of the core pack interconnection busbar 50 that is hanging down and the portion of the positive-side connection busbar 46 that is hanging down are parallel to each other.

Comparing the potentials among all cell group interconnection busbars 44 in this configuration, the cell group interconnection busbar 44 that connects the first cell group 40e closest to the negative terminal of the connector 20 and the second cell group 42d right above the first cell group 40e presents the lowest potential, for the reason that will be explained later. On the other hand, the cell group interconnection busbar 44 that connects the first cell group 40d most distant from the positive terminal of the connector 20 and the second cell group 42c right below the first cell group 40d presents the highest potential among all cell group interconnection busbars 44. Now, in order that these cell group interconnection busbars 44 can be easily distinguished from other cell group interconnection busbars 44, the cell group interconnection busbar 44 with the lowest potential will hereinafter be referred to as "lowest potential busbar 44a", and the cell group interconnection busbar 44 with the highest potential will be referred to as "highest potential busbar 44b".

The first to fourth cell holders 32a to 32d each have protruding walls to form a frame 52. The cell group interconnection busbars 44, the positive-side connection busbar 46 except for its hanging down portion, and most part of the negative-side connection busbar 48 are fitted in the frames 52.

Heat dissipating sheets 54 are interposed as radiating members between inner walls of the case 12 and the cell group interconnection busbars 44 facing the case 12. Material that is sufficiently elastic and that can be kept compressed between the first cell holder 32a or fourth cell holder 32d and the inner wall of the case 12 is selected as a preferable material to form the heat dissipating sheets 54. This is because in this case the heat dissipating sheets 54 can be in close contact in large area with the first core pack 14 or second core pack 16 and the inner wall of the case 12.

The battery pack 10 according to the first embodiment is configured basically as described above, and its functions and effects will be described next.

When installing the battery pack 10 in an external device such as an electric vehicle etc., the user holds the handle 28 and carries the battery pack 10 to that external device, and then installs the battery pack 10 into a battery installation unit of the external device, in such a manner that the connector 20 and the connector of the external device are electrically connected to each other. Since the connector 20 is disposed in the bottom of the bottom case 18 (see FIG. 1), the battery pack 10 is usually positioned such that its lengthwise direction lies along the direction of gravity, or such that its lengthwise direction is somewhat inclined relative to the direction of gravity. Then, electric power is supplied from the unit cells 30 in the case 12 to the external device when the starter switch of the external device is turned on. That is, the unit cells 30 discharge.

Here, vertically adjacent cell groups are electrically connected in series through the cell group interconnection busbars 44. Also, the negative electrodes of the first cell group 40e are connected to the negative terminal of the connector 20 through the negative-side connection busbar 48, and the positive electrodes of the first cell group 40d are connected to the positive terminal through the positive-side connection busbar 46. Further, the positive electrodes of the first cell group 40h in the second core pack 16 and the negative electrodes of the first cell group 40a in the first core pack 14 are connected through the core pack interconnection busbar 50. Accordingly, electrons move through in order of: the negative terminal, the first cell group 40e, the second cell group 42d, the first cell group 40f, the second cell group 42e, the first cell group 40g, the second cell group 42f, the first cell group 40h, the first cell group 40a, the second cell group 42a, the first cell group 40b, the second cell group 42b, the first cell group 40c, the second cell group 42c, the first cell group 40d, and the positive terminal.

Thus, among all cell group interconnection busbars 44, the potential is lowest at the cell group interconnection busbar 44 that connects the first cell group 40e closest to the negative terminal of the connector 20 and the second cell group 42d right above the first cell group 40e. That is, this cell group interconnection busbar 44 is the lowest potential busbar 44a. On the other hand, among all cell group interconnection busbars 44, the potential is highest at the cell group interconnection busbar 44 that connects the first cell group 40d most distant from the positive terminal of the connector 20 and the second cell group 42c right below the first cell group 40d. That is, this cell group interconnection busbar 44 is the highest potential busbar 44b.

Figure 4:
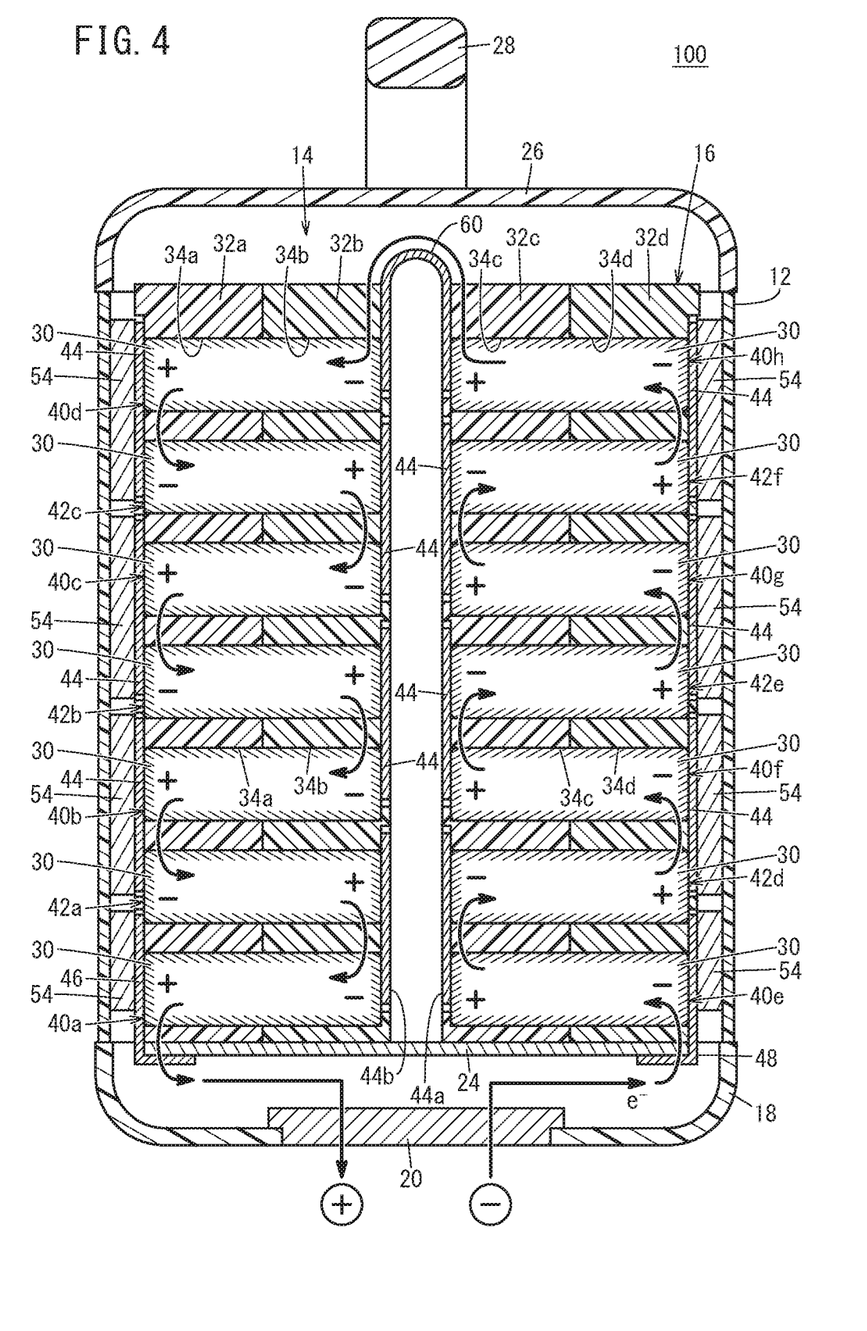
FIG. 4 is a schematic longitudinal cross section of a battery pack in which a second busbar is laid across cell groups that are located most distant from the connector.

Now, FIG. 4 shows a battery pack 100 having a core pack interconnection busbar 60 between the positive electrodes of the first cell group 40h that is most distant from the negative terminal of the connector 20 and the negative electrodes of the first cell group 40d that is most distant from the positive terminal of the connector 20. In order to facilitate understanding, the constituent components corresponding to the constituent components of the battery pack 10 will be labeled using the same reference numerals.

In this battery pack 100, electrons move through in order of: the negative terminal, the first cell group 40e, the second cell group 42d, the first cell group 40f, the second cell group 42e, the first cell group 40g, the second cell group 42f, the first cell group 40h, the first cell group 40d, the second cell group 42c, the first cell group 40c, the second cell group 42b, the first cell group 40b, the second cell group 42a, the first cell group 40a, and the positive terminal. Accordingly, as in the battery pack 10, among all cell group interconnection busbars 44, the cell group interconnection busbar 44 connecting the first cell group 40e closest to the negative terminal of the connector 20 and the second cell group 42d right above the first cell group 40e presents the lowest potential.

On the other hand, the potential is highest at the cell group interconnection busbar 44 that connects the first cell group 40a closest to the positive terminal of the connector 20 and the second cell group 42a right above the first cell group 40a, among all cell group interconnection busbars 44. As can be seen from this, the lowest potential busbar 44a and the highest potential busbar 44b are positioned to face each other in the battery pack 100.

With this configuration, if water enters the case 12 of the battery pack 100 from the battery installation unit, a large short-circuit current may flow between the lowest potential busbar 44a and the highest potential busbar 44b. This is because the potential difference between the lowest potential busbar 44a and the highest potential busbar 44b is larger than the potential differences between other mutually facing cell group interconnection busbars 44, and also because these lowest potential busbar 44a and highest potential busbar 44b are closest to the bottom case 18, among the cell group interconnection busbars 44.

In contrast, in the battery pack 10, although the lowest potential busbar 44a is located closest to the bottom case 18, the highest potential busbar 44b is located most distant from the bottom case 18. In this way, the lowest potential busbar 44a and the highest potential busbar 44b can be positioned so as not to face each other, by providing the first cell group 40d, which is most distant from the connector 20, with the positive-side connection busbar 46 electrically connecting the first cell group 40d and the connector 20.

The potential difference between the lowest potential busbar 44a and the cell group interconnection busbar 44 that faces this lowest potential busbar 44a is about ½ the potential difference between the lowest potential busbar 44a and the highest potential busbar 44b. Hence, even if water enters the case 12 of the battery pack 10 from the battery installation unit, the short-circuit current between the lowest potential busbar 44a and the cell group interconnection busbar 44 facing the lowest potential busbar 44a becomes small, because the potential difference between the lowest potential busbar 44a and that cell group interconnection busbar 44 that are closest to the bottom case 18 is small.

As described so far, the lowest potential busbar 44a and the highest potential busbar 44b are positioned so as not to face each other, whereby it is possible to eliminate the fear that a large short-circuit current might flow even if a short circuit occurs. This is because the potential difference is small between the lowest potential busbar 44a and the cell group interconnection busbar 44 that are closest to the bottom case 18. As a result, the amount of heat generated by the unit cells 30 is reduced. This makes it possible to avoid excessive increase in the temperature of the battery pack 10.

Next, referring to FIGS. 5 and 6, a battery pack 70 according to a second embodiment will be described. The constituent components corresponding to the constituent components shown in FIGS. 1 to 3 will basically be labeled using the same reference numerals and will not be described in detail again.

The battery pack 70 of the second embodiment includes a plurality of core pack interconnection busbars 72 (second busbars). Each core pack interconnection busbar 72 is bent to be substantially U-shaped, with a flat plate-like material bent at two places, so as to electrically series-connect a first cell group in the first core pack 14 and a first cell group in the second core pack 16, or a second cell group in the first core pack 14 and a second cell group in the second core pack 16.

More specifically, the first core pack 14 includes a first cell group 40a, a second cell group 42a, a first cell group 40b, a second cell group 42b, a first cell group 40c, a second cell group 42c, and a first cell group 40d in this order upward from the bottom closest to the bottom case 18 (connector 20). On the other hand, the second core pack 16 includes a first cell group 40e, a second cell group 42d, a first cell group 40f, a second cell group 42e, a first cell group 40g, a second cell group 42f, and a first cell group 40h in this order upward from the bottom closest to the bottom case 18 (connector 20). Then, the negative electrodes of the first cell group 40e are electrically connected to the negative terminal of the connector 20 through a negative-side connection busbar 48. Also, the positive electrodes of this first cell group 40e are electrically connected to the negative electrodes of the first cell group 40a through the core pack interconnection busbar 72.

The positive electrodes of the first cell group 40a are electrically connected to the negative electrodes of the second cell group 42a right above the first cell group 40a through a cell group interconnection busbar 44 (first busbar). The positive electrodes of the second cell group 42a are electrically connected to the negative electrodes of the second cell group 42d through the core pack interconnection busbar 72.

Further, the positive electrodes of the second cell group 42d are electrically connected to the negative electrodes of the first cell group 40f right above the second cell group 42d through a cell group interconnection busbar 44. The positive electrodes of the first cell group 40f are electrically connected to the negative electrodes of the first cell group 40b through the core pack interconnection busbar 72.

In the same way, a cell group located below and the cell group located above are electrically connected through a cell group interconnection busbar 44, and a cell group in the first core pack 14 and the cell group of the second core pack 16 facing each other are electrically connected through the core pack interconnection busbar 72. Then, the positive electrodes of the first cell group 40h most distant from the connector 20 are connected to the negative electrodes of the first cell group 40d through the core pack interconnection busbar 72, and the positive electrodes of this first cell group 40d are electrically connected to the positive terminal of the connector 20 through a positive-side connection busbar 46 (fourth busbar).

In this battery pack 70, in discharging operation, electrons move through in order of: the negative terminal, the first cell group 40e, the first cell group 40a, the second cell group 42a, the second cell group 42d, the first cell group 40f, the first cell group 40b, the second cell group 42b, the second cell group 42e, the first cell group 40g, the first cell group 40c, the second cell group 42c, the second cell group 42f, the first cell group 40h, the first cell group 40d, and the positive terminal. Accordingly, among all core pack interconnection busbars 72, the cell group interconnection busbar 44 closest to the connector 20 (the one connecting the first cell group 40e and the first cell group 40a) is a lowest potential busbar 72a. The potential at the core pack interconnection busbars 72 becomes larger in the upward direction. That is, the core pack interconnection busbar 72 most distant from the connector 20 (the one connecting the first cell group 40h and the first cell group 40d) is a highest potential busbar 72b.

That is, also in this battery pack 70, although the lowest potential busbar 72a is closest to the bottom case 18, the highest potential busbar 72b is most distant from the bottom case 18. In this way, also in the second embodiment including the plurality of core pack interconnection busbars 72, the lowest potential busbar 72a and the highest potential busbar 72b can be positioned so as not to face each other, by providing the first cell group 40d, which is most distant from the connector 20, with the positive-side connection busbar 46 electrically connecting the first cell group 40d and the connector 20.

Among all core pack interconnection busbars 72, the potential at the core pack interconnection busbar 72 that is located above the lowest potential busbar 72a is higher next to the potential at the lowest potential busbar 72a. In this way, in the battery pack 70, the lowest potential busbar 72a and the core pack interconnection busbar 72 with the second lowest potential adjoin in the vertical direction. Accordingly, the potential difference is small between the lowest potential busbar 72a that is closest to the bottom case 18 and the core pack interconnection busbar 72 that adjoins it. Hence, short circuit is less likely to occur between the lowest potential busbar 72a and the core pack interconnection busbar 72 located thereabove, even if water enters the case 12 of the battery pack 70 from the battery installation unit.

As described above, also in the second embodiment, the lowest potential busbar 72a and the highest potential busbar 72b are positioned so as not to face each other. This eliminates the fear of short circuiting as in the first embodiment. Furthermore, even if a short circuit occurs, the short-circuit current is small and so the amount of heat generation is also small. This makes it possible to avoid excessive increase in the temperature of the battery pack 70.

Figure 5:
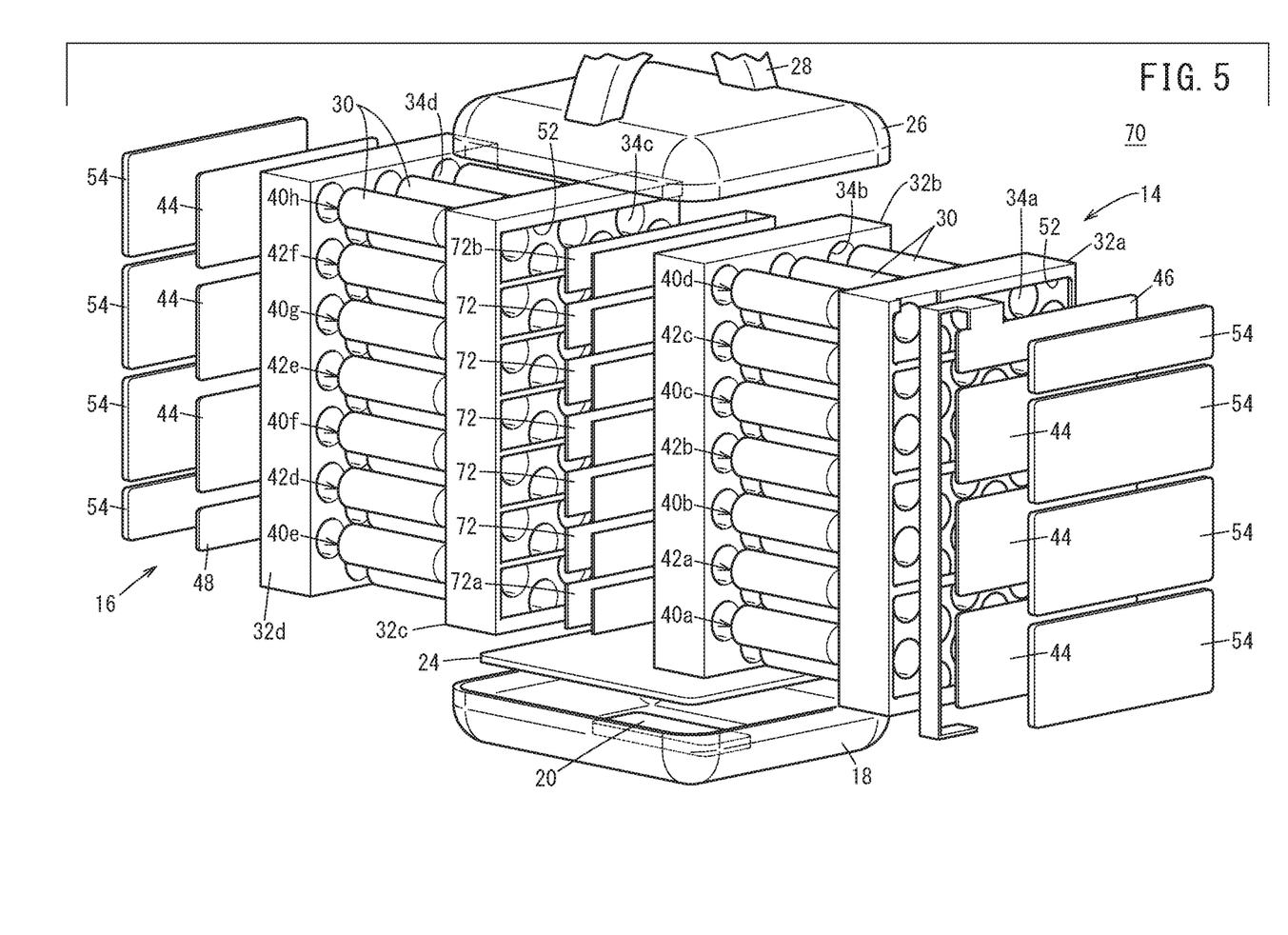
FIG. 5 is a schematic exploded perspective view of a battery pack according to a second embodiment of the present invention.
Figure 6:
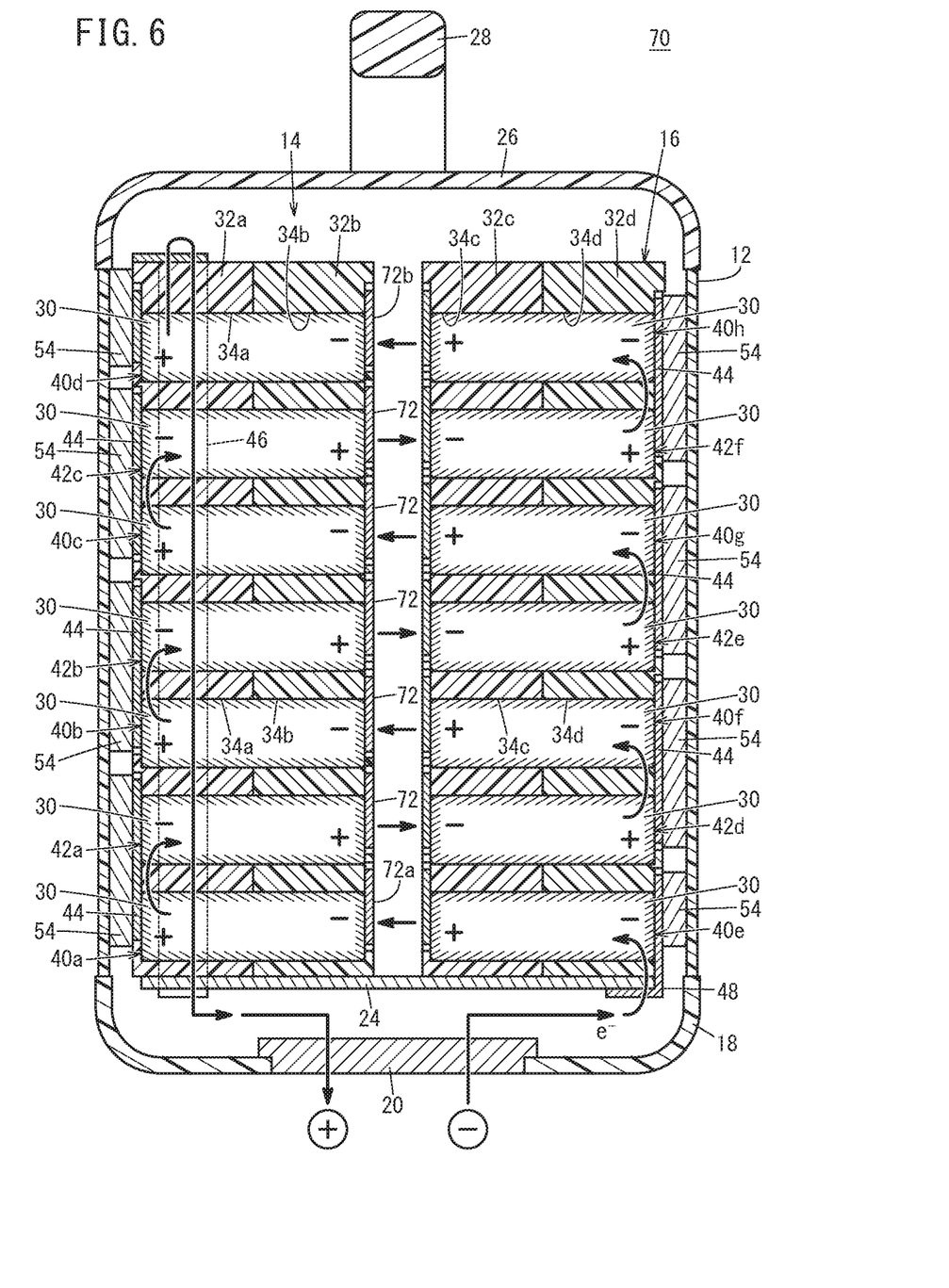
FIG. 6 is a schematic longitudinal cross section taken along a lengthwise direction of the battery pack of FIG. 5.
Figure 7:
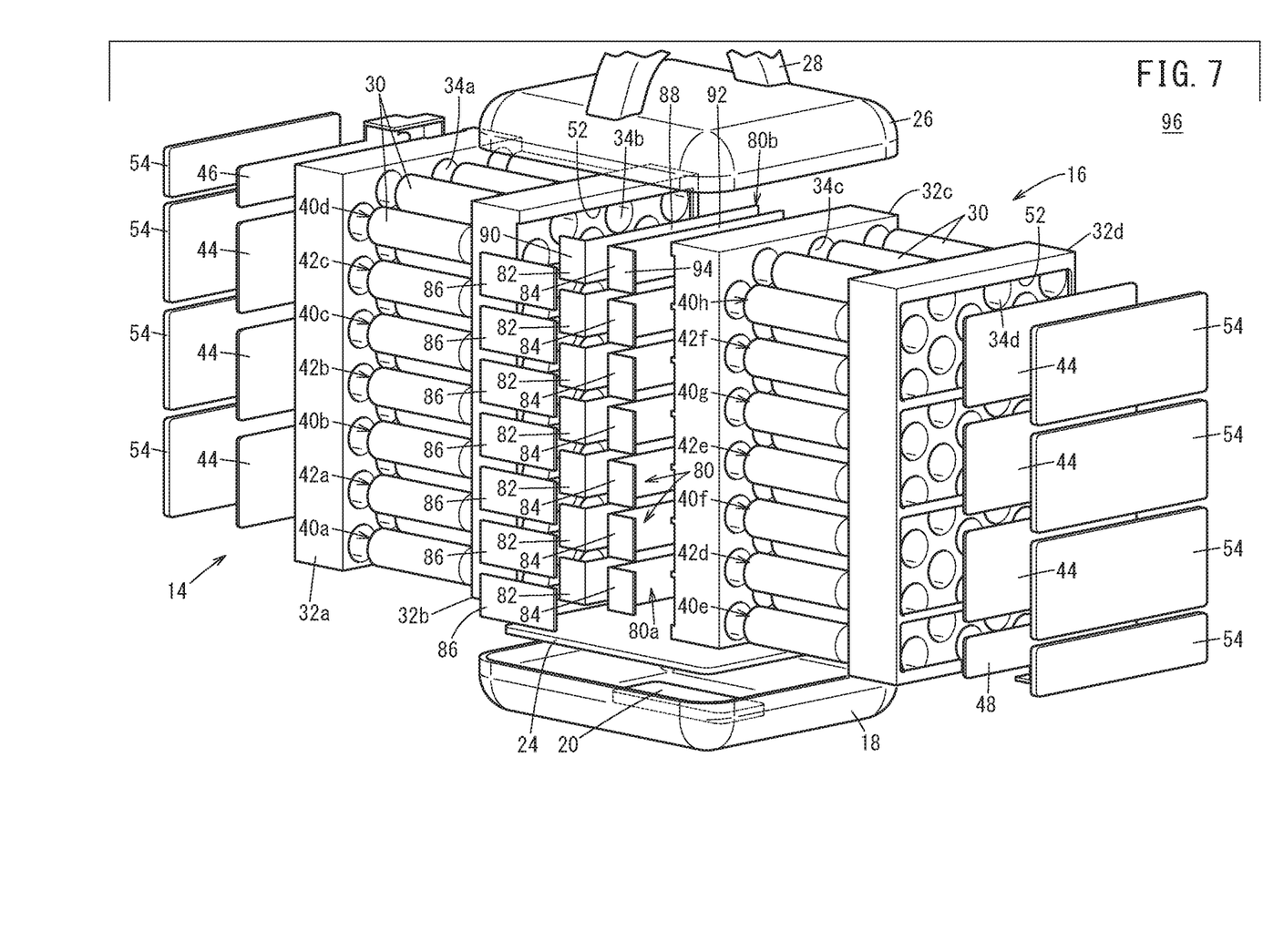
FIG. 7 is a schematic exploded perspective view of a battery pack having second busbars each composed of three members.

The core pack interconnection busbars 72 shown in FIGS. 5 and 6 are each formed by bending a plate-like single member as described earlier. Alternatively, core pack interconnection busbars 80 as shown in FIG. 7 may be adopted. The core pack interconnection busbars 80 each include a first parallel member 82, a second parallel member 84, and a series member 86 electrically connecting the first parallel member 82 and the second parallel member 84.

Each first parallel member 82 is substantially L-shaped, with a first body 88 and a first tab 90. The first body 88 parallel-connects the negative electrodes of one of the first cell group 40a, the first cell group 40b, the first cell group 40c, and the first cell group 40d, or the positive electrodes of one of the second cell group 42a, the second cell group 42b, and the second cell group 42c. The first tab 90 is exposed out of the second cell holder 32b and is bent by about 90 degrees to the first cell holder 32a side.

Similarly, each second parallel member 84 is substantially L-shaped, with a second body 92 and a second tab 94. The second body 92 parallel-connects the positive electrodes of one of the first cell group 40e, the first cell group 40f, the first cell group 40g, and the first cell group 40h, or the negative electrodes of one of the second cell group 42*d*, the second cell group 42*e*, and the second cell group 42*f*. The second tab 94 is exposed out of the third cell holder 32*c* and is bent by about 90 degrees to the fourth cell holder 32*d* side.

Each series member 86 is laid across the first parallel member 82 and the second parallel member 84. Accordingly, the positive electrodes or negative electrodes connected in parallel through the first parallel member 82 and the negative electrodes or positive electrodes connected in parallel through the second parallel member 84 are connected in series through the series member 86.

In a battery pack 96 having the core pack interconnection busbars 80, electrons move along the same route as that in the battery pack 70. Accordingly, also in this battery pack 96, a lowest potential busbar 80*a* and a highest potential busbar 80*b* can be positioned so as not to face each other, eliminating the fear that a large short-circuit current might flow, as in the embodiments shown above. Furthermore, even if a short circuit occurs, the amount of heat generation is small and so excessive increase in the temperature of the unit cells 30 and the battery pack 96 can be avoided.

Further, in this case, it is not necessary to bend a flat plate multiple times to obtain the core pack interconnection busbar 80. This offers improved resistance to metal fatigue of the core pack interconnection busbars 80. Further, the core pack interconnection busbars 80 having a smaller number of bent portions than the core pack interconnection busbars 72 are advantageous to reduce the amount of heat generation.

The present invention is not particularly limited to the embodiments described above but can be modified in various manners without departing from the essence and gist of the present invention.

For example, the negative electrodes of the unit cells 30 may be first electrodes and the positive electrodes may be second electrodes. The third busbar and the fourth busbar may be the positive-side connection busbar 46 and the negative side connection busbar 48, respectively.

Figure 8:
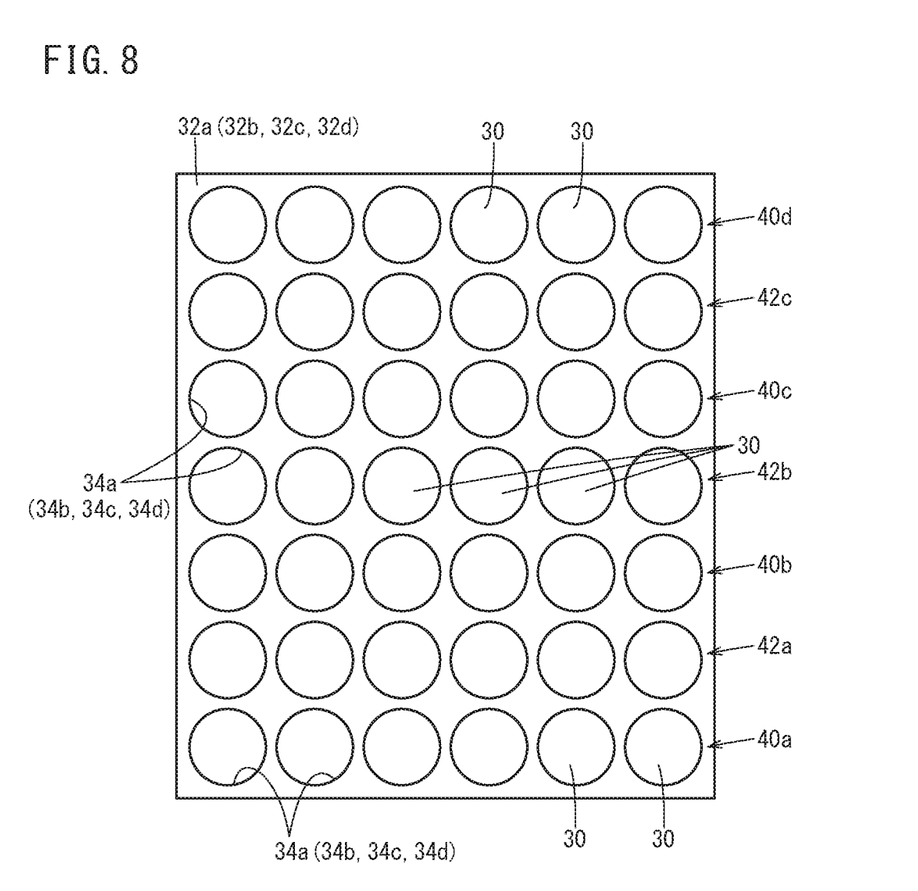
FIG. 8 is a schematic front view of cell groups each including a plurality of unit cells arranged in a straight line.

The cell groups are not limited to cell groups in which a plurality of unit cells 30 are arranged in a zigzag fashion. The unit cells 30 may be arranged in straight lines as shown in FIG. 8.

What is claimed is:

1. A battery pack including: a case accommodating a plurality of unit cells each having a first electrode and a second electrode; and a connector provided at a bottom of the case,
    wherein a lengthwise direction of the battery pack is a top-bottom direction,
    the battery pack comprising:
    a first core pack and a second core pack each including a cell holder configured to hold a plurality of the unit cells, the first core pack and the second core pack being accommodated in the case so as to face each other,
        wherein, the first core pack includes a first end surface and a second end surface that is a back surface with respect to the first end surface,
        the second core pack includes a third end surface that faces the second end surface, and a fourth end surface that is a back surface with respect to the third end surface,
        in the first core pack and the second core pack, first cell groups are constituted by a plurality of the unit cells that are positioned in such a manner that the first electrodes thereof are directed in a same direction, and second cell groups are constituted by a plurality of the unit cells that are positioned in such a manner that the first electrodes thereof are directed in a direction opposite to the direction in which the first electrodes of the unit cells of the first cell groups are directed, the first cell groups and the second cell groups being arranged alternately in the top-bottom direction;
        the unit cells of the first cell groups and the unit cells of the second cell groups are oriented along a widthwise direction that is orthogonal to the lengthwise direction;
    a plurality of first busbars each configured to electrically connect the unit cells of one of the first cell groups and the unit cells of one of the second cell groups within the same core pack, on the first end surface and the second end surface of the first core pack or on the third end surface and the fourth end surface of the second core pack;
    one second busbar configured to electrically connect the electrode on the second end surface of the lowermost or uppermost unit cell of one of the first cell groups or the second cell groups in the first core pack and the electrode on the third end surface of the lowermost or uppermost unit cell of one of the first cell groups or the second cell groups in the second core pack;
    one third busbar configured to electrically connect the connector and the lowermost unit cell of one of the first cell groups or the second cell groups in the first core pack or the second core pack, the lowermost unit cell being closest to the connector; and
    one fourth busbar configured to electrically connect the connector and the uppermost unit cell of one of the first cell groups or the second cell groups in the first core pack or the second core pack, the uppermost unit cell being most distant from the connector,
    wherein
    the first busbars on the second end surface and the first busbars on the third end surface face each other,
    a lowest potential busbar with the lowest potential of the first busbars is located lowermost on the second end surface of the first core pack or the third end surface of the second core pack in the case,
    a highest potential busbar with the highest potential of the first busbars is located uppermost on the second end surface of the first core pack or the third end surface of the second core pack in the case,
    the second busbar electrically connects the uppermost unit cell of the first core pack and the lowermost unit cell of the second core pack, and
    the third busbar is provided on one of the first end surface and the fourth end surface, and the fourth busbar is provided on the other of the first end surface and the fourth end surface in a manner so as to overlap either the first core pack or the second core pack when viewed from a direction perpendicular to an axial direction of the plurality of unit cells.

2. The battery pack according to claim 1, wherein the second busbar is provided in singularity, and the single second busbar electrically connects the unit cells of one of the first cell groups or the second cell groups that is closest to the connector in the first core pack, and the unit cells of one of the first cell groups or the second cell groups that is most distant from the connector in the second core pack.

3. The battery pack according to claim 1, wherein the second busbar is provided in plurality, and each of the second busbars electrically connects the unit cells of one of the first cell groups or the second cell groups in the first core pack, and the unit cells of one of the first cell groups or the second cell groups in the second core pack, the cell group in the first core pack and the cell group in the second core pack facing each other.

4. The battery pack according to claim 3, wherein each of the second busbars includes a first parallel member electrically connected to the unit cells of one of the first cell groups in the first core pack or to the unit cells of one of the second cell groups in the first core pack, a second parallel member electrically connected to the unit cells of one of the second cell groups in the second core pack or to the unit cells of one of the first cell groups in the second core pack, and a series member configured to electrically connect the first parallel member and the second parallel member.

* * * * *